MULTIPLE MODE AIRCRAFT CLOCK SYNCHRONIZATION

Filed Jan. 2, 1969 2 Sheets-Sheet 1

INVENTORS
WILLIAM V. SCOTT
WILLIAM T. LENNON jr.
BY Alexander & Dowell
ATTORNEYS

MULTIPLE MODE AIRCRAFT CLOCK SYNCHRONIZATION

Filed Jan. 2, 1969 2 Sheets-Sheet 2

INVENTORS
WILLIAM V. SCOTT
WILLIAM T. LENNON jr.
BY Alexander & Dowell
ATTORNEYS

United States Patent Office 3,564,544

Patented Feb. 16, 1971

3,564,544

MULTIPLE MODE AIRCRAFT CLOCK SYNCHRONIZATION

William V. Scott, Depew, and William T. Lennon, Jr., Tonawanda, N.Y., assignors to Sierra Research Corporation, a corporation of New York Filed Jan. 2, 1969, Ser. No. 788,560
Int. Cl. G01s *9/56, 9/10*
U.S. Cl. 343—6.5 25 Claims

ABSTRACT OF THE DISCLOSURE

A system for synchronizing aircraft clocks to an established master time, the clocks having varying degrees of stability and these degrees establishing different modes of local operation, depending upon momentary estimates of local clock accuracy; and the different modes including graduated rates of clock correction, as well as the selection of time slots in different series designated for occupancy by aircraft having estimated clock errors of different magnitudes, the system including an asynchronous back-up mode occupied by aircraft whose clocks are entirely out of synchronization. The system further includes means for selecting unoccupied slots, for establishing coarse synchronization in one mode, for then proceeding by proportional clock correction to modes of higher degrees of synchronization, and for changing to appropriate other unoccupied time slots and reducing the magnitude of subsequent clock corrections as a result of improvement in the degree of clock synchronization.

Figure 1A:
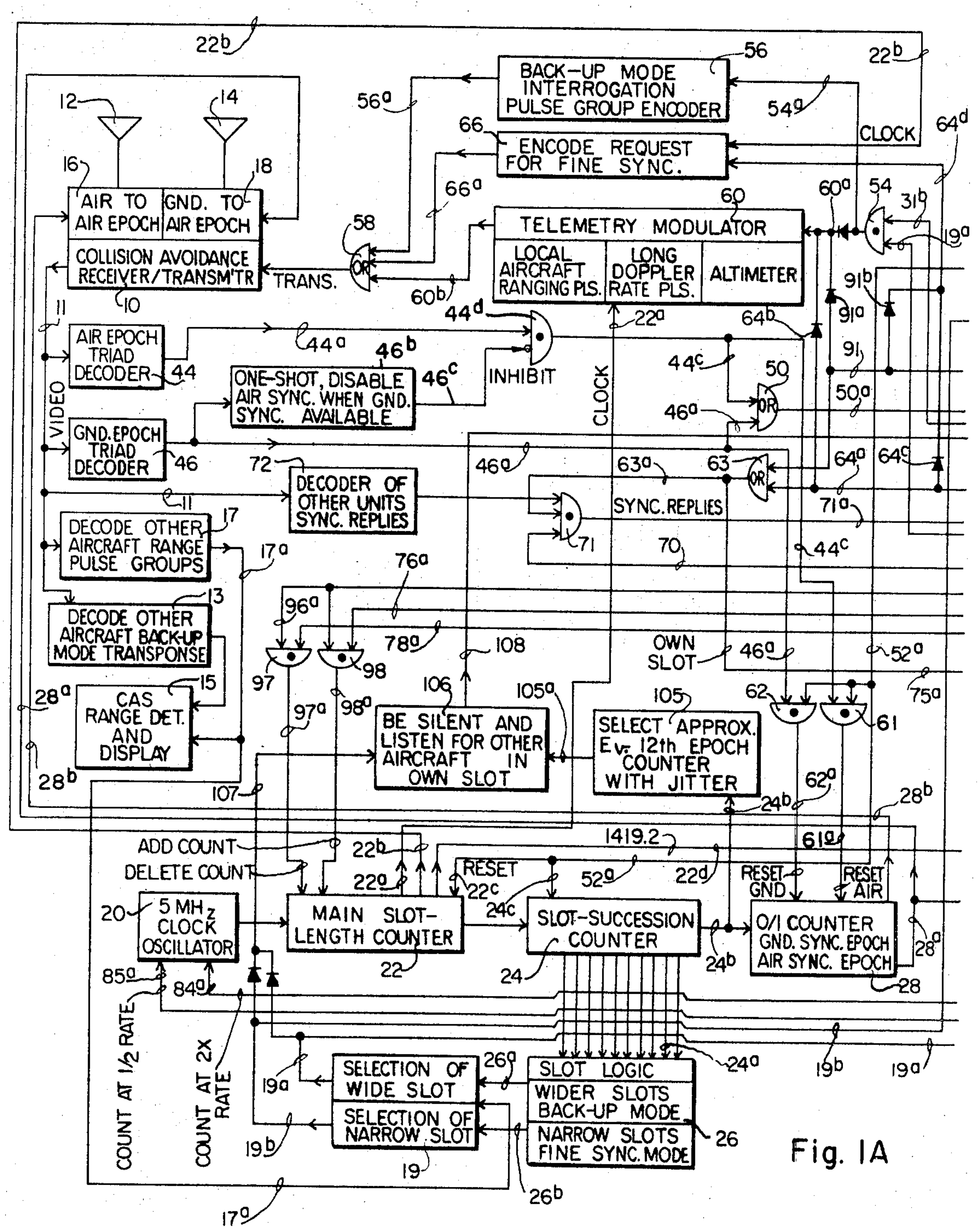

This invention relates to a time sharing system for collision avoidance and navigation of aircraft, and more particularly relates to a system for operating in various different modes extending from an asynchronous back-up mode, assuming no synchronization at all to a system-wide or worldwide master time, through semisynchronized modes, and then to a fully synchronized time sharing mode, the system also including means to down-grade the mode of operation when substantial clock error is detected or when no synchronization has been acquired within a predetermined time period.

This invention will be described against the background of specifications issued by the Air Transport Association of America (ATA) for a collision avoidance system (CAS) designed primarily to be used by commercial carrier aircraft in which a network of fixed-position CAS units are proposed which would all be very accurately synchronized together, within approximately ½ microsecond, to establish a worldwide time system to which the aircraft then synchronize themselves. The ATA specification proposes repeating epochs of time slots, each epoch containing 2000 time slots of 1500 microsecond duration so that each epoch lasts for three seconds. The overall cycle of the system however is 6 seconds in view of the fact that every alternate epoch serves as a synchronization epoch using signals from a ground station, interlaced with other epochs in which synchronization can be obtained by the aircraft from other highly synchronized aircraft.

According to the ATA system, within its own time slot a synchronized aircraft transmits its own CAS ranging reference signal comprising a coded pulse group having a long Doppler rate characteristic, followed by other pulse-position modulated signals providing an indication of the aircraft's altitude, and the aircraft transmitting other data including a number from 1 through 63 indicating the estimate made by the transmitting aircraft of the degree of its own clock synchronization, etc. The number 1 is transmitted by an aircraft which has just been synchronized directly by a ground station, whereas subsequent numbers are transmitted to indicate how many intervening aircraft have contributed to the degree of synchronization of the present aircraft, or alternatively to indicate how long it has been since the most recent resynchronization or verification. Other synchronized aircraft receiving these signals can determine range by oneway techniques, for instance as taught in Minneman Pat. 2,869,121, or in Maresca Pat. 3,119,107 or in Perkinson Pat. 3,258,896, or the Michnik et al. Pat. 3,336,591 or some other existing system. An aircraft acquiring synchronization from another aircraft adds one number to the numeral transmitted from the aircraft to indicate the length of the chain of succession by which it acquired synchronization. The ground CAS stations in the worldwide network transmit a triad of synchronizing pulses at the beginning of each odd numbered epoch, and each highly synchronized aircraft transmits a different triad of pulses to mark the beginning of each even numbered epoch, and these pulses are used by other aircraft to acquire coarse synchronization of their own time clocks assuming that no such synchronization then exists. Each aircraft which has acquired coarse synchronization selects and occupies one of a number of broad time slots designated for coarsely synchronized aircraft and begins transmitting its own ranging, Doppler and altitude pulses, but in addition also transmits a request for fine synchronization during its own time slot. A ground station, or a highly synchronized aircraft, can transmit a reply to such requests, and if such a reply is received from a better synchronized aircraft it will arrive at the requesting aircraft at a predetermined moment of synchronization arbitrarily selected to occur at a standard position late in the same time slot occupied by that aircraft. In the present example, the moment of synchronization in each 1500 microsecond time slot occurs at 1419.2 microseconds as counted out by a binary counter whose full time-slot count is 1500 microseconds. Using typical prior art synchronization schemes, the reply pulses are often timed in order to eliminate the propagation delay between the transmitting synchronization donor and the receiving synchronizee aircraft so that if the latter is perfectly synchronized, it will receive the reply precisely at 1419.2 microseconds after the beginning of its own time slot. In some typical prior art schemes, if the synhronization is less than exact, the reply pulse group will be received at a time displaced by twice the clock error in microseconds, the displacement of the reply pulse occurring subsequent to the moment of synchronization (1419.2) if the local time clock is early, but if the time clock is late the reply will be received in advance of the moment of synchronization (1419.2 microseconds). From the knowledge gained from the displacement of reply pulses with respect to the moment of synchronization each aircraft can determine its own error, and the magnitude of the determined error according the ATA specification makes the aircraft eligible to occupy a slot in one of several different groups of slots. According to the specification at a transmitting and receiving frequency at which back-up mode operation is permissible the first 64 slots in each epoch are 6000 microseconds in duration, as compared with 1500 microsecond slots occurring later on in the epoch. These broader slots are assigned to be occupied by aircraft which are only coarsely synchronized, and their occupancy of broader slots indicates coarse synchronization thereof to other aircraft. Hence, an aircraft capable of operation with different degrees of synchronization must keep track of two kinds of slots, namely broader and narrower, since its eligibility for occupancy of one or the other can change at any time depending upon the degree of its synchronization. The aircraft therefore occasionally checks the slot which it is occupying for possible double occupancy, and if such occupancy appears to exist, it moves to a higher numbered slot until it finds an unoccupied slot which it is eligible to occupy. An aircraft which has not recently been synchronized or which has not yet been synchronized at all must operate in a so-called back-up mode according to the ATA specification, and during this mode, it transmits an interrogation signal approximately every three seconds inviting a transponder reply from other aircraft receiving that signal so as to obtain an indication of two-way range to the other aircraft. In the back-up mode it also transmits an indication of its altitude and a long Doppler pulse, from which range rate can be determined by other aircraft.

It is a principal object of this invention to provide a system for use aboard an aircraft equipped with a time clock for which synchronization is sought with the above ATA system of worldwide time. The present novel system includes a series of graded modes of operation commencing with a mode 0 which is merely a warm-up mode providing a delay sufficient to allow the equipment to stabilize. This mode then gives way to mode 1 operation in which the system searches for triad pulse groups marking the beginning of epochs and transmitted either by ground stations or by highly synchronized aircraft. While awaiting arrival of such a triad, the aircraft remains in mode 1 and operates in a purely back-up manner as described in the previous paragraph, mode 1 being completely asynchronous. When either a ground triad or an air triad is received, the system resets its clock to coarse synchronization, the reset being made to correspond with the beginning of an odd epoch if the triad decoded bears the encoding of a ground station; or the system resetting to the beginning of an even numbered epoch if the decoded triad was transmitted by an aircraft. The system then steps into mode 2 operation in which its clock is roughly synchronized and in which the aircraft is eligible to acquire and occupy one of the first series of broader time slots in the epoch. Having occupied a suitable vacant time slot, the system then seeks fine synchronization replies by transmitting requests therefore during its own time slot subsequent to the transmission of its own position marking reference pulse group, its long Doppler pulse, and its altitude pulse. Assuming that synchronization replies are received by the aircraft, it will then apply corrections to its local time clock during subsequent epochs until the error of its time clock as determined by the spacing between the predetermined moment of synchronization (1419.2 microseconds) and the received replies indicates no more than a 2 microseconds total error. At this point, the aircraft will enter mode 3 which is the general operating mode of a well synchronized aircraft. Upon entering mode 3, the aircraft will transfer to a narrower unoccupied time slot of the type designated for better-synchronized aircraft, and will then go on seeking further fine synchronization either from other aircraft or from ground stations. If for some reason, the error becomes greater than the permissible ±2 microseconds in mode 3 operation, the system will proceed to mode 4, however, without changing time slots again. In mode 4, a higher rate of clock correction is performed attempting to decrease the error more rapidly and resume synchronization to within ±2 microseconds. If this correction is accomplished, the system will go back into mode 3 operation again. However, if the error becomes consistently greater than an arbitrary 20 microseconds, the system will go back into mode 1, which is the back-up mode, and begin all over again. In addition, if at any time the system fails to acquire satisfactory fine synchronization signals from another suitable source for a period of time, in the present example greater than 192 seconds, the system will then revert to the back-up mode and commence searching for synchronization again.

It is another important object of this invention to provide an efficient system for correcting clock errors in either the early or late direction in mode 3 by adding or subtracting fixed increments to the counting chain in order to make small corrections where the synchronization is very close, and the present system having means for making larger corrections by shifting to counting at either one-half the normal rate or at double the normal rate whenever the system is in mode 2 or mode 4, the change of counting rate being accomplished for a period of time proportional to the magnitude of clock error, namely the time intervening between the predetermined moment of synchronization (1419.2 microseconds) as determined by the local clock and the arrival of a reply pulse used for obtaining better synchronization. This proportional correction occurs in mode 2 and in mode 4 where the errors can be relatively large, but only the small fixed-increment corrections are made during mode 3 operation in which the errors can never be very large.

It is another object of this invention to provide means for making corrections in the time clock in the case where the clock is running early so that the moment of synchronization (1419.2 microseconds) occurs early and the reply pulse, if any, occurs subsequently. The problem in this situation is caused by the fact that no reply pulse may ever be received, therefore an early clock may be indistinguishable from the situation in which no reply pulse is received at all. The present system provides novel means for discriminating between these two situations and making clock corrections only where they are actually appropriate because of the subsequent arrival of a reply pulse.

It is still another object of this invention to provide means for estimating the magnitude of the clock error and for selecting an appropriate mode of operation based on the magnitude of the measured error.

Another important object of this invention is to provide means for selecting an appropriate time slot which the present aircraft is eligible to occupy, such eligibility being based upon the degree of clock synchronization presently existing.

Figure 1B:
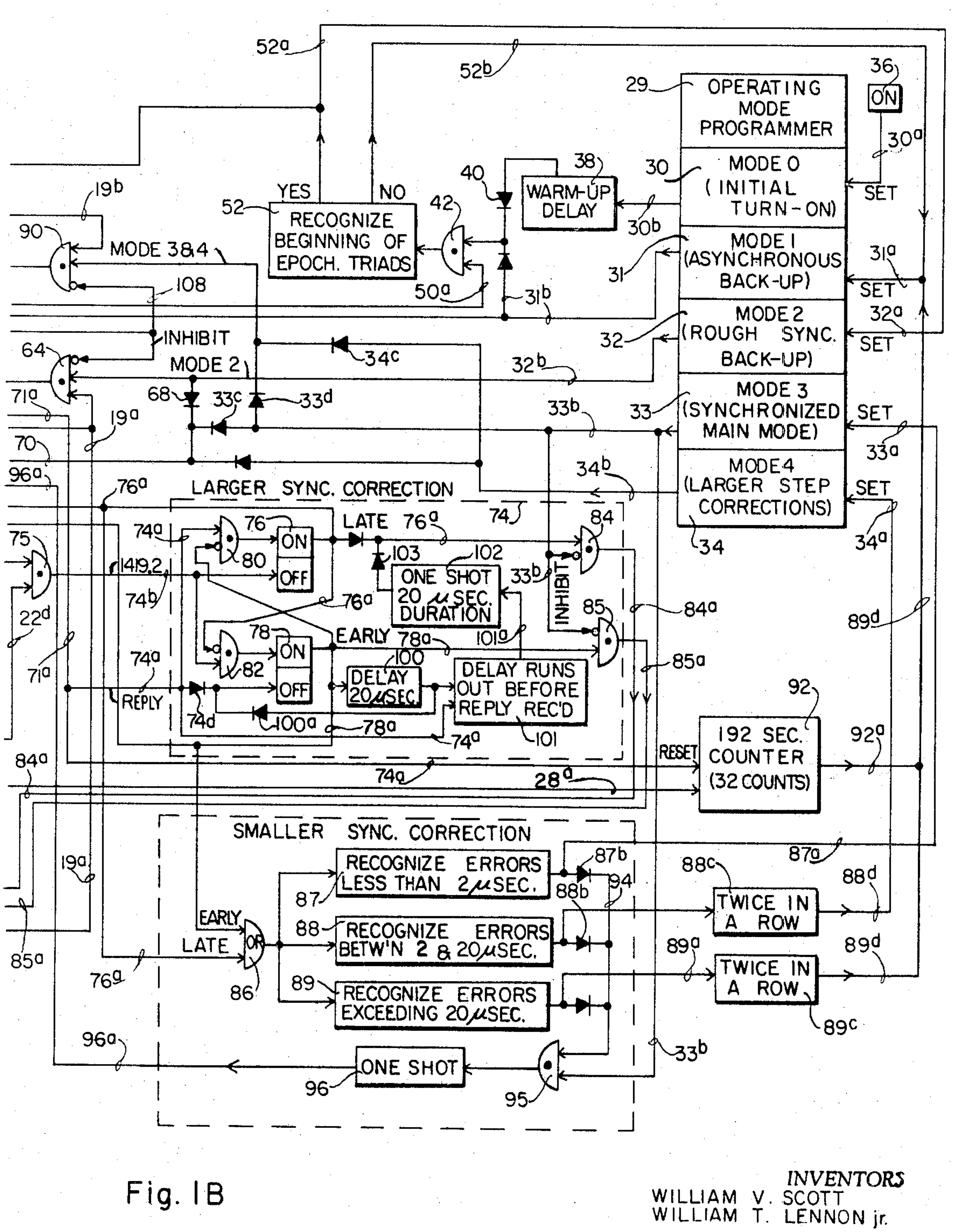

Other objects and advantages of the invention will become apparent during the following discussion of the drawings, wherein:

FIGS. 1*a* and 1*b* when placed side-by-side form a composite block diagram showing an illustrative embodiment of the present invention.

The above-mentioned ATA specification sets forth requirements for any system which is acceptable to the Air Transport Association of America for collision avoidance purposes. The system assumes the existence of a worldwide or system-wide time which is kept at various ground stations within one half microsecond. A repeating time division series includes a new epoch commencing every three seconds and being divided into 2000 time slots. Alternate epochs are designated odd and even respectively, the ground stations transmitting a triad of pulses to mark the beginning of each odd epoch, and well-synchronized aircraft transmitting a somewhat differently encoded triad of pulses to mark the beginning of each even epoch. These two different types of epochs are referred to hereinafter as air epochs and ground epochs respectively, and the division of alternate epochs in this manner is further employed according to the ATA specification as a means for distinguishing between the case in which an aircraft is attempting to become synchronized by interrogating a ground station, and the other manner in which an aircraft can become synchronized to worldwide time, namely by requesting synchronization from another better-synchronized aircraft. The ATA specification further describes various information to be transmitted from each aircraft during its own time slot, as well as a general statement pertaining to the possibility that there may be double occupancy of a particular time slot by several aircraft. In general, during each recurrence of its own time slot, an aircraft having a reasonable degree of synchronization will transmit a pulse group intended to be used by other aircraft to determine range to the transmitting aircraft and this group including a long Doppler pulse from which other aircraft can determine range-rate, and will also transmit an indication of its own altitude. Moreover, each aircraft which has attained a coarse degree of synchronization with worldwide time will transmit during its own time slot a request for fine synchronization either from another aircraft or from a ground station which is within range. There are other transmissions which are also required, for instance the transmission of an indication of how well synchronized a particular aircraft estimates itself to be, but such other transmissions are of no particular concern to the present invention.

In addition to a synchronized mode of operation, the ATA specification provides for an asynchronous mode of operation performable by aircraft which have not achieved a full degree of synchronization with worldwide time. Alternatively, such a mode can be used by aircraft which are provided only with minimal equipment, or by aircraft operating in very isolated areas. This latter type of operation is referred to as a back-up mode in which each aircraft transmits at approximate three second intervals a specially encoded interrogation signal which is replied to by other aircraft by way of a transponder, from which two-way range to the other aircraft can be determined. Finally, the specification designates certain relatively broader time slots for use by aircraft which are poorly synchronized and are attempting to attain fine synchronization, and also provides for narrower time slots for occupancy by well-synchronized aircraft, namely those having a degree of synchronization judged by themselves to be within ±2 microseconds.

The present invention is illustrated by an exemplary embodiment of a system designed to perform under the conditions set forth in the above paragraph, this system including transmitter and receiver means 10 operating on suitable frequencies as set forth in the ATA specification. This equipment further includes two different antennas 12 and 14 mounted respectively above and below the aircraft and switched back and forth during alternate epochs, as will be described hereinafter, employing suitable antenna selecting switches 16 and 18. Each aircraft also includes a time clock system as shown near the bottom of FIG. 1*a* and driven by a local clock oscillator 20 which normally delivers clock pulses at a 5 megahertz rate. The clock also includes the capability of counting at a double rate or at a half rate. These clock pulses are then delivered to a main slot-length counter 22 which counts out 1500 microsecond slot lengths, and in the process of doing so delivers appropriate outputs marking the various significant moments in each time slot as will be described hereinafter. Every 1500 microseconds, the main slot-length counter delivers a pulse to the slot-succession counter 24 which counts out 2000 time slots. The various slots are indicated by combinations of binary outputs on the wires 24*a* which are delivered to a slot logic circuit 26 which counts out the various useable time slots that can be occupied by aircraft, the outputs on wires 26*a* indicating wider time slots which can be occupied by poorly synchronized aircraft operating on a back-up mode frequency, and the outputs on wires 26*b* indicating subsequent narrower time slots which can be occupied by aircraft which have attained fine synchronization. The output on wire 24*b* occurs every three seconds and marks the beginning of a new epoch, and this output is delivered to a two position counter 28 having an output on wire 28*a* indicating commencement of an odd-numbered ground epoch, and an output on wire 28*b* indicating the commencement of an even-numbered air epoch. Thus, each of the wires 28*a* and 28*b* receives a signal every 6 seconds, every alternate epoch. These outputs are delivered upwardly on the wires 28*a* and 28*b* to operate, respectively, the switches 18 and 16 which select the particular antenna upon which transmissions are to be made during successive different epochs.

The clock oscillator 20 is assumed to include a high grade crystal oscillator having good short-term stability. For the present purposes, it will be assumed that the system shown in FIGS. 1*a* and 1*b* is initially completely unsynchronized with worldwide time and is operating in random phase with respect thereto, although it is further assumed that the clock oscillator 20 is running at a 5 megahertz rate.

The present system includes near the upper right-hand corner of FIG. 1*b* an operating mode programmer 29 which is capable of providing an output for selecting any one of the five modes of operation. The differences between these modes of operation are determined by the momentary degree of synchronization of the time clock chain 20 through 28 with worldwide time. In mode 0 and mode 1 it is assumed that there is no synchronization whatever with worldwide time. In modes 2 and 4, it is assumed that there is a considerable degree of synchronization with worldwide time, although not to the extent intended to support full operation of the system as a completely synchronized CAS unit. In mode 3, it is assumed that satisfactory synchronization has been attained and is being maintained. The aircraft can operate in only one mode at a time, and therefore it is assumed that each of these different modes is exclusively selected by a stable device such as a bistable multivibrator, providing an output whenever it is in the "set" condition, and that any one of the set multivibrators is reset to provide no output when any of the other multivibrators is actuated into set position. The multivibrators controlling modes 0, 1, 2, 3 and 4 are respectively provided with the reference characters 30, 31, 32, 33 and 34, each of the multivibrators having an input terminal provided with the superscript *a* by which it can be actuated to "set" condition and further provided with an output terminal bearing the superscript *b* at which an output signal appears when the multivibrator is in set condition.

MODE 0 AND MODE 1

As stated above, it is initially assumed that no degree of synchronization exists at all and that the system is turned off. When it is desired to place the system into operation, the operator will press an "on" button 36 to provide a momentary signal on the wire 30*a* to set the mode 0 flipflop 30 and provide an enabling signal on the wire 30*b*. This signal actuates a delay device 38 which waits a sufficient number of seconds to permit reasonable warm-up of the system, and then provides an output through the isolation diode 40 to enable an AND gate 42. The function of the AND gate 42 is to enable a search for triads of pulses marking the commencement of an epoch, such triads, as stated above, being transmitted by ground stations at the beginning of every odd epoch and by airborne fully synchronized stations at the beginning of each even epoch. Such signals would be received by the received 10 and delivered via its video output wire 11 to several decoders. An air epoch triad decoder 44 serves to recognize triads transmitted by other aircraft at the beginning of each even epoch, whereas the ground epoch triad decoder 46 serves to recognize somewhat differently encoded pulse triads transmitted by ground stations at the beginning of odd epochs. Since synchronization from a ground unit is preferable over synchronization from an air unit, a oneshot is provided which is triggered by the decoding of a ground triad on wire 46*a*. The oneshot 46*b* has a long time constant, longer that three seconds, and delivers an inhibit signal on wire 46*c* to block the gate 44*d* and prevent an air epoch signal from passing to wire 44*c*, so that when both air and ground epoch signals are available, only the latter is used. The outputs of the decoders 44 and 46 are delivered respectively via wires 44*a* and 44*c*, and via the wire 46*a* to an OR gate 50 through which they are passed to a common wire 50*a* and delivered through the enabled AND gate 42 to a recognition circuit 52 such as a one-shot, capable of noting the reception of acceptable triads marking the beginning of epochs by delivering a brief signal on wire 52*a*. The reception of suitable triad initiates an output on the "yes" wire 52*a*. On the other hand, if no such triad is received an output will continue to appear on the "no" wire 52*b*. As an alternative, a multiple stage counter could be incorporated into the recognition circuit 52 and periodically reset in such a manner as to require two or more consecutive epoch triads to be received before an output could appear on "yes" wire 52*a*. Until the latter occurs, the output on the "no" wire 52*b* will serve to set the mode flipflop 31 through the wire 31*a* to thereby provide an output on the mode 1 enable wire 31*b*, which output will pass through an isolation diode and continue to maintain the AND gate 42 in enabled condition so as to continue admitting to the recognition circuit 52 signals on the wire 50*a*, indicating decoded air or ground epoch triads. Thus, in mode 1 no synchronization whatever is assumed and the search continues for either an aircraft or a ground station delivering epoch-commencing triads from which a coarse degree of synchronization can be obtained.

The wire 31*b* also extends leftwardly across FIG. 1*b* and to an AND gate 54 in FIG. 1*a* to maintain the AND gate 54 enabled whenever mode 1 is operating. As will be explained more fully hereinafter, a slot selector 19 will select a coarse back-up mode slot and will deliver an output on wire 19*a* at the beginning thereof, and this output is connected to the other input of the AND gate 54 to provide a pulse during every epoch which will travel through the enabled gate 54 via wide 54*a* to enable a back-up mode interrogation pulse group encoder 56. This encoder has an output on wire 56*a* which passes through an OR gate 58 and actuates the transmitter 10 to transmit an interrogation pulse group which is operative to cause a transponder (not shown) in any equipped aircraft operating with range to provide an encoder reply, the transit time of which is in an indication of two-way range to the replying aircraft. Such a reply would appear when received on the wire 11 in the local aircraft and would be decoded by the decoder 13 to provide a signal to the range detection and disply device 15. The box 15 is intended to represent an entire collision avoidance system range measuring and displaying device, which forms no part of the present invention and is included merely to indicate in a broad manner the utility of having a local aircraft transmit interrogations encoded by the device 56 while the aircraft is operating in the totally unsynchronized back-up mode 1. The ATA specification merely requires that the aircraft perform this function once every three seconds in an effort to determine whether another aircraft will transpond and be within dangerous range of the local aircraft. It may also be desirable to have each aircraft while in the back-up mode 1 transmit a certain amount of data, such as its altitude and/or a long Doppler pulse from which range rate can be determined, etc., and is such additional transmissions are desirable, the output of the gate 54 can be used to operate the telemetry modulator 60 by enabling its input 60*a*. The moments of transmission of the telemetry signal are not actually synchronized with respect to the clocks in other aircraft, because the present time clock is still assumed to be entirely asynchronous. However, clock signals on wire 22*a* will still be taken from the main slot counter 22 and delivered as a triggering input to the telemetry modulator 60.

The system will continue to perform in asynchronous mode 1 until eventually the aircraft approaches either a ground station or another better synchronized aircraft and begins receiving air or ground epoch triad signals marking the beginning of appropriate epochs. As stated above, these signals will appear on wire 50*a* and will be delivered through the still-enabled AND gate 42 to be recognized in the circuit 52. As soon as the recognition circuit 52 notes suitable epoch triads it will deliver an output on wire 52*a* which will set the mode 2 flipflop 32 via the wire 32*a* and thereby remove the output signal 31*b* from the mode 1 flipflop. The removal of this signal from wire 31*b* will disable the AND gate 42, thereby blocking any further effort to recognize triads marking the beginnings of epochs, and the removal will also disable the gate 54, thereby disabling the back-up mode interrogation encoder 56.

On the other hand, the setting of the mode 2 flipflop 32 will provide an output on the wire 32*b*, thereby actuating the various devices which are intended to operate in mode 2 as will be described hereinafter.

Returning to the "yes" output appearing on wire 52*a*, as a result of the momentary recognition of suitable epoch triads, this output will travel downwardly on the wire 52*a* and reset the main slot length counter 22 and the slot-succession counter 24 each to zero count by inputs respectively applied on the wires 22*c* and 24*c*. The beginning of each slot is now roughly synchronized with the worldwide time and the slot succession is roughly synchronized therewith (rough because the clock is late by the amount of transit time of the epoch triad from the transmitting unit to the local aircraft). However, the counter 28 which recognizes the difference between air epochs and ground epochs also needs to be synchronized. It is the purpose of the gates 62 and 61 to make a determination as to which epoch, and odd epoch or an even epoch, was represented by the triad used to reset the counters 22 and 24. Therefore, the "yes" signal on the wire 52*a* momentarily enables both of the AND gates 62 and 61 and any outputs on wires 44*c* and 46*a* will be delivered to the other inputs of the AND gates 62 and 61. Since there will have been a signal only on one of the wires 46*a* and 44*c*, there will be only one output from these two gates, namely either on wire 62*a* to reset the counter 28 to the ground epoch, or on wire 61*a* to reset the counter 28 to an air epoch. Thus, as a result of the appearance on the wire 52*a* of a recognition signal, and an output either on wires 44*c* or 46*a* representing either air triads or ground triads, all of the counters 22, 24 and 28 in the local time slot have been reset to coarse synchronization with the transmitting unit whose triad was received. The signal appears only briefly on wire 52*a* because it serves to set the mode 2 flipflop 32, which results in resetting of the mode 1 flipflop 31 and the consequent deactivating of the recognition circuit 52. At this point, the mode 2 flipflop is set to provide an output on the wire 32*b* and the resulting operation in mode 2 will now be described.

MODE 2

Before proceeding to describe this mode, it should be recalled that there is provision in the ATA specification for different time slots which aircraft are eligible to occupy depending upon their equipment capability, and upon the degree of their clock synchronization in the case of more fully equipped aircraft. In mode 3, the aircraft is assumed to be enjoying a high degree of synchronization, whereas in mode 2 it may be only coarsely synchronized. It is therefore still assumed to be in the back-up mode when operating in mode 2, and must occupy a slot in the series of broader time slots available to coarsely synchronized aircraft.

In view of the fact that each aircraft when changing modes, for instance as between mode 2 and modes 3 and 4, must change time slots occupancy, the aircraft must have a way to arrive at and occupy an unoccupied time slot. One way of accomplishing this purpose is to have the aircraft move from slot to slot until it arrives at an unoccupied one, namely one of the broader first 64 time slots for use in the back-up mode. This is accomplished by having the aircraft occupy a slot, by having it occasionally be silent and listen to detect whether another aircraft may be using the same slot by listening for RF transmissions from other craft during periods of its own silence, and by having the aircraft move to another slot when such double occupancy is detected. The slot logic circuitry 26 provides outputs for wider back-up slots on wires 26*a*, and separate outputs on wires 26*b* representing successive narrower slots for use by highly synchronized aircraft. These outputs are delivered separately to the slot selector 19 which then selects a coarse back-up slot and delivers this selection on wires 19*a*, and also selects a synchronized-mode slot and indicates this selection on wires 19*b*. The outputs on wires 19*a* go across the bottom of FIG. 1*a* and up the left edge of FIG. 1*b* and enables one input of a gate 64 which receives at another enabling input in the form of the signal on wire 32*b* from the mode 2 flipflop 32. The gate 64 is normally not inhibited by the third wire 108 going to it, and therefore there will usually be an output on wire 64*a* during the coarse time slot occupied by the present aircraft whenever it is operating in mode 2. This enabling signal travels upwardly through the isolation diode 64*b* and is used to enable the telemetry modulator 60 during its own time slot in mode 2 so that the aircraft can transmit its own ranging and Doppler-rate pulse, an altimeter reading, and other signals required by the ATA specification. Such transmissions are initiated only during the aircraft's own time slot because only during this slot is there an enabling signal appearing on wire 19*a* to enable the gate 64. Thus, during the coarse slot selected by the present aircraft for operation, the telemetry modulator 60 is actuated at an instant when there is an output appearing on wire 22*a*. Thus, the wire 19*a* selects the chosen time slot and the wire 22*a* provides the clock signal which triggers the telemetry modulator at the appropriate time during the time slot.

In mode 2, the local aircraft is attempting to improve its own degree of synchronization which is initially late by the one-way transit time of the pulse triad transmitted from another station to which the present aircraft coarse synchronized. Therefore, during mode 2 operation, an output from the wire 64*a* is also delivered through an isolation diode 64*c* to enable the encoder 66 which encodes a pulse group requesting fine synchronization from another station within the range. Alternatively, the request for fine synchronization may constitute part of the telemetry pulse signals transmitted during the unit's own slot under the control of the modulator 60. Since the gate 64 is operated only during the back-up mode slot enabled by the wire 19*a*, the encoder 66 can receive an input on wire 64*d* only during the selected time slot. The exact moment at which this request is transmitted is determined by the clock pulse appearing on wire 22*b* and delivered into the other input to the encoder 66. The output of the encoder 66 on wire 66*a* travels through the OR gate 58 to actuate the transmitter to transmit the encoder pulse group, in the same manner that the other encoded transmissions are applied via the gate 58 and the wires 56*a* and 60*b* to the transmitter. Thus, in the semi-synchronized mode 2, the aircraft selects a broad time slot, and during that time slot transmits its own local telemetry data with a request for fine synchronization from another unit. Shortly after the request for such time synchronization, the aircraft expects to receive a synchronization reply from another unit, and therefore part of the enabling signal on mode 2 wire 32*b* passes through the isolation diode 68 and energizes the wire 70 to thereby enable one input to the gate 71.

Since the aircraft is interested only in replies occurring during its own coarse time slot, the wire 64*a* is connected through an OR gate 63 to a second enabling input on wire 63*a* to the gate 71 so that the gate is sensitive to the reception of reply signals from other aircraft only when they occur during the local aircraft's own time slot. These reply signals are decoded by the decoder 72, and when they are received in the appropriate time slot and during mode 2 operation, they are passed via the wire 71*a* as reply signals to a synchronization correction circuit contained within the dashed line box 74 near the center of FIG. 1*b*. This synchronization correction circuit 74 has another input, namely an input taken from the wire 22*d* of the main slot counter 22 and representing a predetermined arbitrary moment of synchronization during each time slot. Since the aircraft is only interested in this predetermined moment of synchronization when it occurs during the aircraft's own time slot, the gate 75 is interposed and is enabled via the wire 75*a* only during a time slot selected by the system in which to operate. Thus, the synchronization correction circuit 74 receives two inputs, one appearing on the wire 74*a* and representing the moment of reception of a reply from another aircraft to the present aircraft's own request for synchronization, and the other input to the circuit 74 appearing on wire 74*b* and comprising the predetermined arbitrary moment of synchronization in the aircraft's own time slot, which moment has been arbitrarily selected to comprise the count 1419.2 of the main counter 22 which counts to a total of 1500 microseconds. The selection of an arbitrary moment of synchronization to occur prior to the end of a time slot has been suggested in other prior patents, for instance Perkinson Pat. 3,258,896 and Michnik Pat. 3,336,591 so that synchronization can be completed within the limits of that time slot even when the reply from the synchronizer arrives late.

In any event, the general type of synchronization employed in this illustrative system is a complementary counting system as suggested in the above two mentioned patents in which the synchronizing aircraft sends back a reply designed to arrive at the local aircraft at the precise moment of synchronization, if synchronization is perfect. If not, the reply typically arrives at a time $\Delta t$ which represents twice the synchronization error, the time of arrival of the reply at $\Delta t$ typically occurring after the moment of synchronization if the local time clock is early and before the moment of synchronization if the local time clock is late. This general idea of having the synchronizer send a pulse designed to arrive at the synchronizee at a predetermined moment of synchronization has also been suggested in other prior patents which also show other variations of the general idea. The present system is such that if the local time clock is late its 1419.2 count will appear on wire 74*b* after the received reply signal appears on wire 74*a*. If the local time clock is early its 1419.2 count on wire 74*b* will precede the received reply signal on wire 74*a* by twice the time error. This fact is used in the synchronization correction circuit 74 to determine both the direction and the amount of the error.

Normally, in mode 2, the local time clock will be late because coarse synchronization was arrived at by having the local clock reset itself to the moment of arrival of the triad marking the beginning of an epoch as transmitted by another unit, and the arrival of this triad at the local aircraft will always be late by an amount of time equalling the one-way transit time of the triad from the transmitting unit to the local aircraft. Therefore, in mode 2 operation, it is only necessary to describe the correction of the local clock to overcome lateness thereof. In modes 3 and 4, the clock can be either late or early and therefore the early condition will be described hereinafter.

The synchronization correction circuit 74 comprises two flip-flops 76 and 78. They are provided with gates 80 and 82 so that when one of the flip-flops is on, the other flip-flop cannot also be turned on, but has the "on" input thereto inhibited. For instance, the input on wire 74*a* to the "on" side of flip-flop 76 is inhibited by gate 80 whenever there is an output on wire 78*a* from the other flip-flop 78. Likewise, a signal on wire 74*b* is inhibited by gate 82 from turning on the flip-flop 78 by an output on wire 76*a* whenever the flip-flop 76 is in "on" condition. Remembering that it was assumed that right after coarse synchronization in mode 2 the local clock is late, it therefore follows that a reply signal will appear on wire 74*a* before the 1419.2 signal will appear on wire 74*b*. Therefore, the flip-flop 76 will be turned on and the flip-flop 78 will have its off terminal actuated by the occurrence of the reply signal on wire 74*a*. The flip-flop 76 will then remain "on" until the subsequent occurrence of the 1419.2 signal on wire 74*b* which will actuate the off terminal of the flip-flop 76 to thereby remove the output from wire 76*a*. The appearance of an output on wire 76*a* indicates that the local clock is late, and the length of time that this signal appears on wire 76*a* is proportional to the degree to which the local clock is late. Actually, the duration of the signal on wire 76*a* amounts to twice the time increment by which the local clock is late. The signal on wire 76*a* passes through a normally conductive gate 84, which is inhibited only in mode 3 operation, and the output continues along wire 84*a* and travels leftwardly to the five megahertz clock oscillator 20 and causes it to count at a double rate for the duration of the signal on wires 76*a* and 84*a*. Thus, the additional counts counted into the main slot counter 22 will have the effect of making the clock earlier during the next epoch, and the length of time during which the clock will be counted at double rate will be determined by the length of time the "late" signal persists on wire 84*a*. The "late" signal also travels downwardly on wire 76*a* through an OR gate 86 and into three time-constant circuits which recognize the degree by which the clock is in error. The upper circuit 87 recognizes errors which are less than 2 microseconds in duration. The circuit 88 recognizes errors which are between 2 microseconds and 20 microseconds; and the circuit 89 recognizes errors that are in excess of 20 microseconds. Each of these circuits has an output as will be discussed hereinafter, and the recognition circuit 87 also has another output on the wire 87*a* which is connected to set the mode 3 flip-flop via the wire 33*a* when the error in mode 2 becomes less than 2 microseconds. When this happens the signal on wire 87*a* actuates the mode 3 flip-flop 33 thereby disabling the mode 2 flip-flop and the gate 64, which had caused the system to operate in one of the wider time slots required for semi-synchronized aircraft operating in mode 2.

MODE 3

Mode 3 is the main operating mode in which the system is intended to normally operate after it has once become synchronized, and until something should happen to cause the synchronization thereof to fall outside of tolerable limits. The several ways in which the failure of mode 3 operation can occur will be described hereinafter, but while the system is maintaining proper synchronization the mode 3 operation continues. During mode 3 operation, an enabling signal appears on wire 33*b*, and this signal inhibits the output gates 84 and 85 in the correction circuit 74 to prevent its outputs from making larger-increment corrections in the clock. In mode 3, only small-increment corrections are made by a circuit to be described hereinafter. The signal on wire 33*b* passes through two isolation diodes 33*c* and 33*d* and enables the gates 71 and 90. The enabling of the gate 71 permits decoded synchronization replies from other aircraft occurring during the local aircraft's time slot to be applied to the wire 71*a*, and therefore to the early-late gates 78 and 76 of the sync correction circuit 74. On the other hand, the enabling of the gate 90 permits an enabling signal to appear on the wire 91 during the unit's own time slot, assuming that no inhibit signal is applied by the wire 108 to the other input of the gate 90, as will be hereinafter discussed. The signal on the wire 91 travels upwardly through the isolation diode 91*a* and enables the telemetry modulator 60 so as to permit it to transmit during its own time slot the appropriate ranging and Doppler pulse, an altimeter signal, etc. at the time selected by slot counter output on the clock wire 22*a*. The output on the wire 91 also passes upwardly through the isolation diode 91*b* and places an enabling signal on wire 64*d*, thereby enabling the encoder 66 to send out fine synchronization requests at a moment during its own time slot as determined by a slot counter signal appearing on wire 22*b*.

Thus, the effect of changing from mode 2 to mode 3 has been, among other things, to block the gate 64 and enable the gate 90, thereby moving the system from the broader back-up mode time slot, selected by output on wire 19*a* from the selector 19, to a narrower time slot selected by the wire 19*b* which enables the gate 90. The system is now operating in a narrower time slot of the type designated for well-synchronized aircraft, the time slot having been selected by the circuit 19. The signal on wire 91 also passes through the OR gate 63 and enables the gate 71 as well as the gate 75, these two gates respectively passing received synchronization reply signals and predetermined synchronization moment (1419.2) signals to the synchronization correction circuit 74. During mode 3 operation, since the gates 84 and 85 are inhibited at all times, the outputs are always inhibited on wires 84*a* and 85*a*, and it is these outputs that make relatively larger changes in the synchronism of the local time slot because they double or halve the rate of counting for as long a time as a late or an early signal persists. Therefore, if there is a large error, the rate of the local clock will be doubled or halved for a long time, thereby creating a large correction. Such a large correction is desirable in mode 2, but when operating in mode 3, it would be highly undesirable to make a large correction because the degree of error is assumed to be no greater than $\pm 2$ microseconds. Therefore, the gates 84 and 85 are always inhibited during mode 3 operation.

Instead, the early-late signals are applied by wires 78*a* and 76*a* to the OR gate 86, and as long as the error remains less than $\pm 2$ microseconds, only the circuit 87 will provide an output on the wire 87*a* to the isolation diode 87*b*. This diode provides a signal on the wire 94 which is applied to the AND gate 95, and this AND gate is enabled during mode 3 operation by the signal appearing on wire 33*b*. The signal from gate 95 triggers a one-shot circuit 96 to issue a signal on the wire 96*a* to the AND gates 97 and 98. The other inputs to these AND gates are connected respectively to wires 76*a* and 78*a*, only one of which can be activated at a time, the former representing a late and the latter representing an early signal. Therefore, a brief output will appear either on the wire 97*a* or 98*a*, the former making a small correction in the main counter to delete one 200 nanosecond clock count in the event that the counter is early, and the latter entering a brief signal on the wire 98*a* to add one 200 nanosecond count in case the clock is slightly late. This latter circuitry therefore provides a small increment correction in the count amounting only to .2 microsecond change each time an early or late indication is made which represents less than a total error of $\pm 2$ microsecond. These small additions or subtractions in the counts are made in the main counter 22 by either adding a pulse in the second stage or by deleting a carry function out of the first stage.

During mode 3, it is possible for the clock error to run either early or late, but it is also possible for the clock error to go beyond a $\pm 2$ microsecond error. For instance, the aircraft may temporarily experience loss of contact from any unit from which synchronization can be obtained, with the result that upon resumption of contact the clock may be considerably in error. If a larger error is noted by the recognition circuit 88, for instance lying between 2 and 20 microseconds, then a small correction is made by passing a signal through the diode 88*b* and the wire 94 to actuate the one-shot 96 to add or delete one count in the manner just described above. If such an error is noted only once, no other action is taken. However, if an output appears twice on wire 88*a*, the "twice in a row" circuit 88*c*, which can for example comprise a leaky integrator circuit driving a one-shot, will issue a pulse on the wire 88*d* and set the mode 4 flipflop 34 through the wire 34*a*, thereby cancelling mode 3, and entering a mode 4 operation.

MODE 4

As a result of setting the mode 4 flipflop 34, an output will appear on the wire 34*b* which will continue to enable the gate 90 through the isolation diode 34*c*, and the enabling of this gate will continue to enable the gates 71 and 75 as well as to continue enabling the telemetry modulator 60 and the request for fine sync circuit 66, so that the system will remain in the same narrower fine-sync time slot selected by wire 19*b* and continue to seek better synchronization. However, the inhibit signal will have been removed from the wire 33*b* and the gates 84 and 85, and therefore the system will be able to correct larger errors more quickly because the clock can now be corrected through the wires 85*a* and 84*a* to count at half rate or double rate depending upon the direction of the error and to continue such abnormal counting rate for the duration of the error signal. The one-shot 96 will no longer make small counter-correction changes via the wire 96*a* because the gate 95 is not enabled by the wire 33*b* in mode 4.

If the corrections made in mode 4 are adequate to return the total error within ±2 microsecond limits, a new output will then appear on wire 87*a* and return the system to normal mode 3 operation. On the other hand, if for some reason the error grows beyond 20 microseconds, then this fact will be detected by the recognition circuit 89 and an output will appear on the wire 89*a*. If this magnitude of error occurs twice in a row, an output will be obtained from the "twice" circuit 89*c* on the wire 89*d*, and this output will reset the system into mode 1 via the wire 31*a*, thereby returning the system to back-up asynchronous mode and causing it to start all over again in an effort to resynchronize itself.

Since there is always the possibility that an aircraft may simply fly out-of-range and away from all sources of synchronization, thereby resulting in complete loss of reply signals on the wire 74*a*, the present system is further equipped with a counter circuit 92 which receives clock signals every six seconds from the wire 28*a* which signals count the counter 92 upwardly. In the working embodiment of the present system, this counter has a total count of 192 seconds (32 counts), but the counter can be reset to zero by any sync reply signal appearing on the wire 74*a*. On the other hand, if no such signal appears for 192 seconds, regardless of which of the higher modes, 2, 3 or 4, the system is operating in, the counter 92 overflows on the wire 92*a* which puts a signal on the wire 89*d* and sets the mode 1 flipflop 31, thereby throwing the system into the completely unsynchronized mode 1.

Thus, recapitulating, in mode 4 an error occurring between 2 and 20 microseconds throws the system back into a mode of opreation employing the larger error corrective increments of mode 2 to provide maximum clock corrections until the error falls within ±2 microseconds again. If the error becomes consistently larger than 20 microseconds, the system goes back into asynchronous operation, and this same reversion occurs also if the system receive no synchronization whatever for a period of 192 seconds.

A further description of the efforts to correct the synchronization in mode 4 is required for the purpose of explaining how the system operates to correct itself if the clock is early. Recalling what was said above, when the clock runs later than the reply signal from the synchronization donor, it is a certainty that a reply has been received because the reply is received from the other unit on wire 74*a* before the moment of synchronization (1419.2) occurs on the wires 22*d* and 74*b* from the main slot counter 22. On the other hand, if the clock is running early, the signal at the count of 1419.2 will occur first, but there is an uncertainty as to whether a sync reply signal on wire 74*a* will ever be received from another unit at all. In other words, within a reasonable length of time, an early clock is indistinguishable for the case where no reply signal at all is received. It is therefore difficult to know whether the apparent error results from having no other unit reply to a request for synchronization or whether it results from a large early error, in which case the reply signal received will occur much later than the synchronization moment 1419.2.

In the latter case, when the clock runs early, and the signal on wire 74*b* turns on flipflop 78 resulting in a signal on the "early" wire 78*a*, this signal passes through the gate 85 in mode 4 and is taken via the wire 85*a* to reduce the clock pulses to one-half the normal counting rate. If shortly thereafter a reply signal is actually received, the reply signal passes through the isolation diode 74*d* and turns off the flipflop 78. Thus a proper increment of correction has been made for the duration of the early signal by having the main clock oscillator 20 count at one-half the normal rate. On the other hand, if no such reply were received on the wire 74*a*, flipflop 78 would remain the "early" signal on the wire 78*a* indefinitely. Therefore, a delay circuit 100 is introduced which waits for 20 microseconds after the early signal first appears, and if no reply signal has been received during that time, it provides an output through the isolation diode 100*a* to turn off the flipflop 78. However, the clock has now been corrected to count at half-rate for 20 microseconds which represents a drastic slowing of the clock which is also an erroneous slowing thereof since no reply signal was ever received on the wire 74*a*. Therefore, a make-up group of pulses has to be counted into the clock in order to restore the clock to its condition before the erroneous count occurred. This is accomplished by having a comparison circuit 101 receive both the output of the delay circuit 100 and the reply signal taken from the wire 74*a*. The camparison circiut 101 determines whether the delay introduced by the circuit 100 occurred before any reply signal appeared on the wire 74*a*, and when this happens, it delivers an output on the wire 101*a* to a one-shot 102 whose pulse lasts for 20 microseconds. This 20 microsecond pulse is connected through an isolation diode 103 to apply the signal persisting for 20 microseconds to the wire 76*a*, thereby actuating the wire 84*a* to cause the clock oscillator 20 to count at twice the normal rate for a period of 20 microseconds. As a result, the erroneous slowing of the clock of 20 microseconds is now compensated by an equal speeding up the count for the same length of time. On the other hand, if the circuit 101 determines that a reply was received on wire 74*a* before the delay introduced by the circuit 100 ran out, then no compensation is necessary because the correction of the clock was truely in response to a proper "early" signal.

A similar result can be obtained by counting the "early" error into a separate counter and retaining it for a period of time to determine whether or not a reply signal will be subsequently received. If it is received, in due course, then the count stored in the separate counter can be used to alter the clock rate to half of its normal rate for an appropriate period of time. The latter alternative system would seem somewhat more expensive than that shown in the present block diagram.

It will be recalled in connection with the circuits 19 and 26 appearing at the bottom of FIG. 1*a* that it is quite possible to have selected for occupancy an already occupied slot, or to fly into closer range with another aircraft which had also selected the same slot. Thus, double slot occupancy may develop or occur. The present system seeks to avoid double occupancy, at least for any significant length of time, by using a system similar to that suggested in Chisholm Pat. 3,161,869 in which each aircraft remains quiet in its own slot, every now and then, and listens to see if any other aircraft is using the same slot. This function is accomplished in the present diagram by taking an output on the wire 24*b* from the slot succession counter 24, this output occurring every three seconds, or once per epoch. This output is then introduced into a counter 105 which selects approximately every 12th epoch. The selection is deliberately jittered, so as to avoid the possibility that the local aircraft might be selecting the same slot at the same time for silence as another aircraft which also occupies that slot. Therefore a random change is introduced into the exact number of epochs counted by the counter 105. At any rate, a signal appears on the average about every 12th epoch on the wire 105a and this signal is introduced into the circuit 106 together with a signal appearing on wire 107 which shows which slot is being checked for double occupancy. The signal on wire 107 is taken from the outputs 19a and 19b, namely the slots which have been selected for occupancy by the present aircraft. Thus, about every 12th epoch, an inhibit signal which persists for the length of the slot is delivered during the aircraft's own time slot onto the wire 108, and this inhibit signal is applied both to the gate 64 and to the gate 90, thereby preventing the initiation of any transmission via the modulator 60 or by the encoder 66 during the time slot which has been selected by the circuits 105 and 106 for checking to determine possible double occupancy. If no signal is heard from another aircraft, meaning there is no output theredouring on the wire 17a from the decoder 17, the slots selected are assumed to be satisfactory. On the other hand, if an output appears on wire 17a during a selected slot, that slot is promptly rejected by the circuit 19 which then selects another similar type of slot for occupancy. After one or more such selection steps, an empty slot will be located and the system will then resume operation in the manner described above.

The present block diagram provides only a single illustrative embodiment of the system discussed, and many alternatives are possible beyond those few which have been mentioned in the course of the above description.

What we claim as novel is a follows:

1. In a multiple unit system wherein the units include transmitting and receiving means and include time clock means for operation in synchronism with a system-wide sequence of repeating cycles of time slots to which some of the units are well synchronized and transmit pulse groups marking boundaries of the cycles and other units seek synchronization, said system further comprising:

(a) a programmer operative to select one of plural modes of operation to the exclusion of the others, and including means for initiating a first mode;

(b) means operative during said first mode and responsive to received pulse groups to correct the local clock means to coarse synchronization with said cycles, and responsive to such correction to actuate the programmer to select a second mode;

(c) means operative in said second mode to occupy a time slot and to initiate the transmitting of requests thereduring for fine synchronization replies from well synchronized units;

(d) means responsive to local clock time and to transmitted requests and received replies to determine local clock error and magnitude and to provide larger increments of correction to the clock means;

(e) first means responsive to error magnitudes within permissible tolerances to actuate the programmer to select a third mode, to continue transmitting requests and receiving replies, and to provide smaller increments of correction; and (f) second means responsive to error magnitude excursions beyond said tolerances to actuate the programmer to select another mode providing larger increments of correction.

2. In a system as set forth in claim 1, timer means for accumulating a predetermined interval of time, and operative at the end of that interval to actuate the programmer to return to the first mode; and means responsive to the receiving of a fine synchronization reply before the end of an interval to reset the timer means to commence a new interval.

3. In a system as set forth in claim 1, said second error-magnitude responsive means including means operative to recognize error excursions exceeding a predetermined boundary between coarse and fine synchronization, and responsive to the recognition of such error magnitude to actuate the programmer to return to the first mode.

4. In a system as set forth in claim 1, said second error-magnitude responsive means including means operative to recognize error excursions within a range exceeding said permissible tolerances but still within a predetermined boundary between coarse and fine synchronization, and responsive to error excursions within the latter range to actuate the programmer to select another mode providing larger increments of correction than those provided in the third mode.

5. In a system as set forth in claim 1, some of the well synchronized units being ground units and others being aircraft units, and the sequence of cycles including alternate ground and air cycles of time slots wherein in the former case the ground units transmit said pulse groups encoded in a distinctive way and in the latter case the aircraft units transmit other differently encoded pulse groups, and said clock means including counter means for keeping track of said alternate cycles; means in each aircraft for decoding and recognizing the variously encoded pulse groups, and means operative in the first mode to reset the clock counter means to correspond with the type of alternate cycle represented by the code group decoded.

6. In a system as set forth in claim 5, said air units and said ground units transmitting replies to received requests during their respective cycles, and means in each unit seeking synchronization including means for using ground unit replies to the exclusion of air unit replies for synchronization of its local clock means when both types of replies are available.

7. In a system as set forth in claim 1, wherein the cycles of time slots include slots of a first type designated for occupancy by poorly synchronized units and slots of a second type designated for occupancy by well synchronized units, the units seeking synchronization each including means for selecting for occupancy slots of both types and for delivering two outputs which are respectively enabled during each type of slot selected, said means operative in the second mode including means responsive to selection of the second mode by said programmer and to output from the slot selecting means representing the first type of slot to initiate said transmitting of requests; and means responsive to selection of the third mode by the programmer and to output from the slot selecting means representing the second type of slot to continue said transmitting and receiving and to provide said smaller increments of correction.

8. In a system as set forth in claim 7, the transmitting and receiving means in each such unit including means for transmitting and receiving two-way range interrogations and transponder replies to received interrogations; means operative during the first mode for actuating said means for transmitting to other units such interrogations during the occupied first type of time slot and receiving their replies to determine likehood of collision therewith; and means in each such unit operative during the third mode for actuating means for transmitting one-way range-determination reference pulses during the occupied second type of time slot, said reference pulses being useful to other synchronized units in determining range to the transmitting unit.

9. In a system as set forth in claim 7, each such unit having means actuated by the clock means for occasionally omitting transmissions by the local unit during the slot which it occupies; and means responsive to reception of transmissions by other units during the transmission-omitted time slot to actuate said slot selecting means to select a different time slot of the same type.

10. In a system as set forth in claim 7, said second means responsive to error magnitude excursions beyond said tolerances to select said another mode comprising, error recognition means connected to said means to determine local clock error and responsive to errors in excess of said permissible tolerances to deliver an output to actuate the programmer to select a fourth mode wherein the unit provides increments of correction similar in magnitude to those provided in said second mode, and means for continuing to select for occupancy a time slot of the second type.

11. In a system as set forth in claim 1, said time clock means comprising a source of counting pulses and a chain of counters driven thereby, said means for providing smaller increments of correction comprising means for selectively inserting into and deleting from the counter chain individual counts depending upon whether the local clock means is late or early.

12. In a system as set forth in claim 11, said means for providing larger increments of correction comprising means for actuating said pulse source to selectively drive the counter chain at twice the normal pulse rate or at half then normal pulse rate depending upon whether the local clock means is late or early.

13. In a system as set forth in claim 1, said time clock means comprising a chain of counters driven by a clock pulse source and the local unit transmitting requests for synchronization near the beginning of its occupied time slot and receiving replies from other units timed and transmitted by the latter to arrive at the local unit at a fixed and predetermined moment during the same time slot, the local clock error being determined by the instant of reception of the reply with respect to said predetermined moment according to the local clock means; means actuated by the reception of a reply before the occurrence of said predetermined moment to actuate said means for providing corrections to drive the clock means at a higher-than-normal count rate; and being actuated by the subsequent occurrence of said predetermined moment to return the clock means to its normal count rate.

14. In a system as set forth in claim 13, means actuated by the occurrence of said predetermined moment before the reception of a reply to actuate said means for providing correction to drive the clock means at a lower-than-normal count rate; and being actuated by the subsequent reception of a reply to return the clock means to its normal counting rate.

15. In a system as set forth in claim 14, delay means having a fixed delay period and actuated by the occurrence of said predetermined moment before the reception of a reply; means for determining when no reply is received before the end of said delay period and in the latter case for actuating the counter means to count at a higher-than-normal rate for a period sufficient to compensate out the lower-than-normal counting rate counted in during the former period.

16. In a system as set forth in claim 1, said second means responsive to error magnitude excursions beyond said tolerances including consistency checking means requiring more than one such error magnitude before selecting another mode.

17. In a time sharing system including multiple units having transmitting and receiving means and having time clock means counting out repeating cycles of time slots including a first series of time slots designated for occupancy by units having only coarse synchronization with a system-wide master time and including a second series of time slots designated for occupancy by units having a fine degree of synchronization with said master time, and said units including means for exchanging request and reply pulses between units useful for bringing the clock means in synchronizer units into closer synchronization with synchronizer units, each synchronizer unit including:

(a) means for determining the magnitude and direction of its own clock means error based upon said exchange of pulses with a synchronizor unit;

(b) means for selecting and occupying one of said first-series slots when the error exceeds a magnitude representing a predermined boundary between coarse and fine synchronization, and for correcting the clock error in relatively larger increments;

(c) means for selecting and occupying one of said second-series slots when the error is less than said boundary magnitude, and for providing said larger increments of correction while the error is still greater than a predetermined close-tolerance limitation magnitude; and (d) means for providing clock-error corrections in relatively smaller increments when the error is within said close-tolerance limitation.

18. In a system as set forth in claim 17, some of the synchronizor units being ground units and others being aircraft units, and the repeating cycles including alternate ground and air cycles of slots wherein in the former case the ground units transmit reply pulses encoded in a distinctive way and in the latter case the aircraft units transmit other differently encoded reply pulses, and said clock means including counter means for keeping track of said alternate cycles; and means in each unit seeking synchronization including means for using ground unit replies to the exclusion of air unit replies for synchronization of its local clock means when both types of replies are available.

19. In a system as set forth in claim 17, the transmitting and receiving means in each such unit including means for receiving interrogations and for transmitting transponder replies in response to received interrogations; means operative when the error exceeds said boundary for actuating said transmitting means to transmit to other units such interrogations during the occupied first-series time slot and receiving their replies to determine likelihood of collision therewith; and means in each such unit operative when the error is within said boundary for actuating said transmitting means to transmit one-way range determination reference pulses during the occupied second-series time slot, said reference pulses being useful in determining range to the transmitting unit by other units.

20. In a system as set forth in claim 17, means actuated by the clock means for occasionally omitting transmissions by the local unit during the slot which it occupies; and means responsive to reception of transmissions by other units during the transmission-omitted time slot to cause the unit to move to and occupy a different time slot of the same type.

21. In a system as set forth in claim 17, said time clock means comprising a source of counting pulses and a chain of counters driven thereby, said means for providing smaller increments of correction comprising means for selectively inserting into and deleting from the counter chain individual counts depending upon whether the local clock means is late or early.

22. In a system as set forth in claim 21, said means for providing larger increments of correction comprising means for actuating said pulse source to selectively drive the counter chain at twice the normal pulse rate or at half the normal pulse rate depending upon whether the local clock means is late or early.

23. In a system as set forth in claim 17, said time clock means comprising a chain of counters driven by a clock pulse source, and the local unit transmitting requests for synchronization near the beginning of its occupied time slot and receiving replies from other units timed and transmitted by the latter to arrive at the local unit at a fixed and predetermined moment during the same time slot, the local clock error being determined by the instant of reception of the reply with respect to said predetermined moment according to the local clock means; means actuated by the reception of a reply before the occurrence of said predetermined moment to actuate said means for providing correction to drive the clock means at a higher-than-normal count rate; and being actuated by the subsequent occurrence of said predetermined moment to return the clock means to its normal count rate.

24. In a system as set forth in claim 23, means actuated by the occurrence of said predetermined moment before the reception of a reply to actuate said means for providing correction to drive the clock means at a lower-than-normal count rate; and being actuated by the subsequent reception of a reply to return the clock means to its normal counting rate.

25. In a system as set forth in claim 24, delay means having a fixed delay period and actuated by the occurrence of said predetermined moment before the reception of a reply; means for determining when no reply is received before the end of said delay period and in the latter case for actuating the counter means to count at a higher-than-normal rate for a period sufficient to compensate out the lower-than-normal counting rate counted in during the former period.

References Cited

UNITED STATES PATENTS 3,409,889 11/1968 Graham ------------ 343—7.5

RICHARD A. FARLEY, Primary Examiner

T. H. TUBBESING, Assistant Examiner

U.S. Cl. X.R.

343—7.5